US 9,353,669 B2

(12) United States Patent  (10) Patent No.: US 9,353,669 B2
Matsumoto et al.  (45) Date of Patent: May 31, 2016

(54) ERROR RELEASING DEVICE FOR WORK VEHICLE AND ERROR RELEASING METHOD FOR WORK VEHICLE

(71) Applicant: Komatsu Ltd., Tokyo (JP)

(72) Inventors: Hayato Matsumoto, Hiratsuka (JP); Mitsuhiro Shimazu, Fujisawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/370,648

(22) PCT Filed: Feb. 28, 2014

(86) PCT No.: PCT/JP2014/055189
§ 371 (c)(1),
(2) Date: Jul. 3, 2014

(87) PCT Pub. No.: WO2015/025542
PCT Pub. Date: Feb. 26, 2015

(65) Prior Publication Data
US 2015/0300232 A1  Oct. 22, 2015

(51) Int. Cl.
*G01M 17/00*  (2006.01)
*F01N 3/00*  (2006.01)
(Continued)

(52) U.S. Cl.
CPC .......... *F01N 11/00* (2013.01); *F02D 41/0235* (2013.01); *F02D 41/22* (2013.01); *F01N 2550/05* (2013.01); *F01N 2610/02* (2013.01);
(Continued)

(58) Field of Classification Search
USPC .......................................... 701/32.6; 60/288
See application file for complete search history.

(56) References Cited

U.S. PATENT DOCUMENTS 6,502,391 B1 * 1/2003 Hirota ................. F01N 3/0814
60/288
8,392,719 B2   3/2013 Kawai et al.
(Continued)

FOREIGN PATENT DOCUMENTS

DE  10 2008 014 922 A1   9/2008
DE  11 2010 004 874 T5   10/2012
(Continued)

OTHER PUBLICATIONS

International Search Report and Written Opinion dated May 27, 2014, issued for PCT/JP2014/055189.
(Continued)

*Primary Examiner* — Thomas G Black
*Assistant Examiner* — Tyler Paige
(74) *Attorney, Agent, or Firm* — Locke Lord LLP (57) ABSTRACT

An error releasing device for a work vehicle to release an error related to an exhaust gas treatment system when the error related to the exhaust gas treatment system has occurred includes: an input unit configured to input at least temporary input information; an authentication unit including a processing algorithm common with a processing algorithm of an external device that generates the temporary input information, and configured to authenticate the input temporary input information by using the processing algorithm; and an error release processing unit configured to release the error related to the exhaust gas treatment system when the temporary input information acquired from the external device by using inquiry information obtained through a predetermined operating procedure is input and further the temporary input information is authenticated by the authentication unit.

9 Claims, 5 Drawing Sheets

(51) Int. Cl.
*F01N 11/00* (2006.01)
*F02D 41/02* (2006.01)
*F02D 41/22* (2006.01)

(52) U.S. Cl.
CPC ... *F01N 2900/1814* (2013.01); *F02D 2041/228* (2013.01)

(56) References Cited

U.S. PATENT DOCUMENTS

| | | |
|---|---|---|
| 8,452,488 B2 | 5/2013 | Suzuki et al. |
| 2003/0140680 A1* | 7/2003 | Nagashima ............ F01N 3/101 73/23.32 |
| 2003/0154044 A1* | 8/2003 | Lundstedt ............ G01N 21/274 702/104 |
| 2003/0182050 A1* | 9/2003 | Maegawa ............... F01N 3/101 701/114 |
| 2005/0015604 A1* | 1/2005 | Sundararajan ......... G06F 21/36 713/184 |
| 2008/0000218 A1* | 1/2008 | Handler .................. F01N 9/002 60/273 |
| 2008/0276312 A1 | 11/2008 | Kawai et al. |
| 2010/0050601 A1* | 3/2010 | Nakamura ............ B01D 53/90 60/277 |
| 2010/0122522 A1* | 5/2010 | Tsukada et al. .......... E02F 9/00 60/284 |
| 2012/0245760 A1 | 9/2012 | Ikeya |
| 2013/0158776 A1* | 6/2013 | Rini ....................... G06F 17/00 701/29.4 |
| 2013/0199157 A1* | 8/2013 | Henry .................... F01N 3/208 60/274 |
| 2013/0255236 A1 | 10/2013 | Ishii et al. |
| 2013/0312616 A1* | 11/2013 | Shibamori ........... E02F 9/2095 96/419 |

FOREIGN PATENT DOCUMENTS

| | | |
|---|---|---|
| JP | 2000-073842 A | 3/2000 |
| JP | 2002-070084 A | 3/2002 |
| JP | 2008-102840 A | 5/2008 |
| JP | 2009-053776 A | 3/2009 |
| JP | 2009-127521 A | 6/2009 |
| JP | 2009-243167 A | 10/2009 |
| JP | 2012-027530 A | 2/2012 |
| JP | 2012-225202 A | 11/2012 |
| JP | 2013-227969 A | 11/2013 |
| KR | 10-2001-0027842 A | 4/2001 |
| KR | 10-2005-0085982 A | 8/2005 |
| WO | WO-99/06987 A2 | 2/1999 |
| WO | WO-2011/074672 A1 | 6/2011 |
| WO | WO-2013/184749 A1 | 12/2013 |

OTHER PUBLICATIONS

Office Action dated Apr. 5, 2016, issued for the corresponding German Patent Application and English translation thereof.

* cited by examiner

ERROR RELEASING DEVICE FOR WORK VEHICLE AND ERROR RELEASING METHOD FOR WORK VEHICLE

FIELD

The present invention relates to an error releasing device for a work vehicle and an error releasing method for a work vehicle, by which an error related to an exhaust gas treatment system can be surely released by a specific person such as a service man.

BACKGROUND

Conventionally, there is a known exhaust gas treatment device that removes NOx contained inside exhaust gas of a diesel engine mounted on a work vehicle or the like. According to this exhaust gas treatment device, urea water which is a precursor of a reducing agent is injected to an upstream side of the exhausted gas of the reducing catalyst provided in an exhaust gas pipeline of the diesel engine in accordance with an operating condition of the diesel engine by means of reducing agent injection control, and NOx inside the exhaust gas is reduced with the reducing agent on the reducing catalyst to purify NOx to a harmless component (refer to Patent Literature 1).

Further, Patent Literature 2 discloses a technique in which a user password can be reset by using a various kinds of setting functions via monitor as long as a user knows a service password even in the case where the user has forgotten the user password.

CITATION LIST

Patent Literature

Patent Literature 1: Japanese Patent Application Laid-open No. 2009-127521
Patent Literature 2: Japanese Patent Application Laid-open No. 2002-70084

SUMMARY

Technical Problem

Here, in the case where an error related to the exhaust gas treatment system (hereinafter referred to as exhaust gas treatment system related error) occurs, non-purified exhaust gas may be emitted to the atmosphere, and therefore the work vehicle executes engine output limiting control, to comply with the exhaust emission regulations. While the engine output limiting control is executed, satisfying work cannot be carried out. For such a work vehicle, an error releasing device is required to release the engine output limiting control, and the error is needed to be appropriately released by the error releasing device. By using the error releasing device, a service man or the like can release an exhaust gas treatment system related error preliminarily set after having executed some treatment at an occurrence point of the exhaust gas treatment system related error, thereby achieving to release the engine output limiting control.

However, in the case where the exhaust gas treatment system related error can be easily released by inputting a normal password or executing a specific operation with respect to the error releasing device, the engine output limiting control may be released even though no treatment has been executed to the occurrence point of the exhaust gas treatment system related error. As a result, the non-purified exhaust gas may be exhausted to the atmosphere. For this reason, it is preferable that a specific person such as the service man be allowed to release the exhaust gas treatment system related error.

Here, it can be considered that to release the exhaust gas treatment system related error is permitted when a specific password like the service password used by the service man is input. However, under such a security level, the service password tends to be spread easily to other person, and it is difficult to execute strict management in permitting the release of the exhaust gas treatment system related error.

The present invention is made in view of the above situation, and an object of the present invention is to provide an error releasing device for a work vehicle and an error releasing method for a work vehicle, by which an error related to an exhaust gas treatment system can be surely released by a specific person such as a service man.

Solution to Problem

To solve the above-described problem and achieve the object, an error releasing device for a work vehicle according to the present invention is an error releasing device for a work vehicle to release an error related to an exhaust gas treatment system when the error related to the exhaust gas treatment system has occurred, including: an input unit configured to input at least temporary input information; an authentication unit including a processing algorithm common with a processing algorithm of an external device that generates the temporary input information, and configured to authenticate the input temporary input information by using the processing algorithm; and an error release processing unit configured to release the error related to the exhaust gas treatment system when the temporary input information acquired from the external device by using inquiry information obtained through a predetermined operating procedure is input and further the temporary input information is authenticated by the authentication unit.

Moreover, in the error releasing device for a work vehicle according to the above-described invention, the temporary input information is a one-time password.

Moreover, in the error releasing device for a work vehicle according to the above-described invention, the temporary input information indicates a specific operation with respect to the input unit.

Moreover, in the error releasing device for a work vehicle according to the above-described invention, the temporary input information includes a valid period.

Moreover, the error releasing device for a work vehicle according to the above-described invention includes a display unit configured to display at least an input request display screen for the temporary input information, and when the temporary input information input to the input unit is authenticated by the authentication unit, the valid period of the temporary input information is measured and a remaining time of the valid period is displayed on the input request display screen.

Moreover, the error releasing device for a work vehicle according to the above-described invention includes a display unit configured to display at least an input request display screen for the temporary input information, and the predetermined operating procedure includes an input operation of predetermined hidden information in order to display the input request display screen.

Moreover, in the error releasing device for a work vehicle according to the above-described invention, the display unit displays the inquiry information necessary at a time of acquiring the temporary input information from the external device on the input request display screen.

Moreover, in the error releasing device for a work vehicle according to the above-described invention, the inquiry information is a combination of a specific number of an error releasing device and a key number that is incremented every time the temporary input information is input.

An error releasing device for a work vehicle according to the present invention is an error releasing device for releasing an error related to an exhaust gas treatment system when the error related to an exhaust gas treatment system has occurred, including: an input unit configured to input at least temporary input information; a display unit configured to display at least an input request display screen for the temporary input information; an authentication unit including a processing algorithm common with a processing algorithm of an external device that generates the temporary input information, and configured to authenticate the input temporary input information by using the processing algorithm; and an error release processing unit configured to release the error related to the exhaust gas treatment system when the temporary input information acquired from the external device by using inquiry information displayed on the input request display screen through a predetermined operating procedure including an input operation for a predetermined hidden information is input and further the temporary input information is authenticated by the authentication unit, wherein the inquiry information is a combination of a specific number of an error releasing device and a key number incremented every time the temporary input information is input, the temporary input information is a one-time password including a valid period or information indicating a specific operation with respect to the input unit, and when the temporary input information input to the input unit is authenticated by the authentication unit, the valid period of the temporary input information is measured and a remaining time of the valid period is displayed on the input request display screen.

An error releasing method for a work vehicle according to the present invention is an error releasing method to release an error related to an exhaust gas treatment system when the error related to the exhaust gas treatment system has occurred, including: acquiring inquiry information through a predetermined operating procedure; executing authentication processing by inputting temporary input information acquired from an external device by using the inquiry information; and releasing the error related to the exhaust gas treatment system when the temporary input information is authenticated.

According to the present invention, the authentication unit includes a processing algorithm that is common with a processing algorithm of an external device generating temporary input information such as a one-time password, and authenticates the input temporary input information by using the processing algorithm. The exhaust gas treatment system related error is released in the case where the temporary input information acquired from the external device is input by an error release processing unit, using inquiry information obtained through a predetermined operating procedure such as input of a hidden number, and further the temporary input information is authenticated by the authentication unit. With this configuration, the security level is more improved and the specific person like the service man can surely release the exhaust gas treatment system related error, thereby achieving to comply with the exhaust emission regulations.

DESCRIPTION OF EMBODIMENTS

Hereinafter, an embodiment for carrying out the present invention will be explained with reference to appended drawings.

Entire Configuration of Work Vehicle

Figure 1:
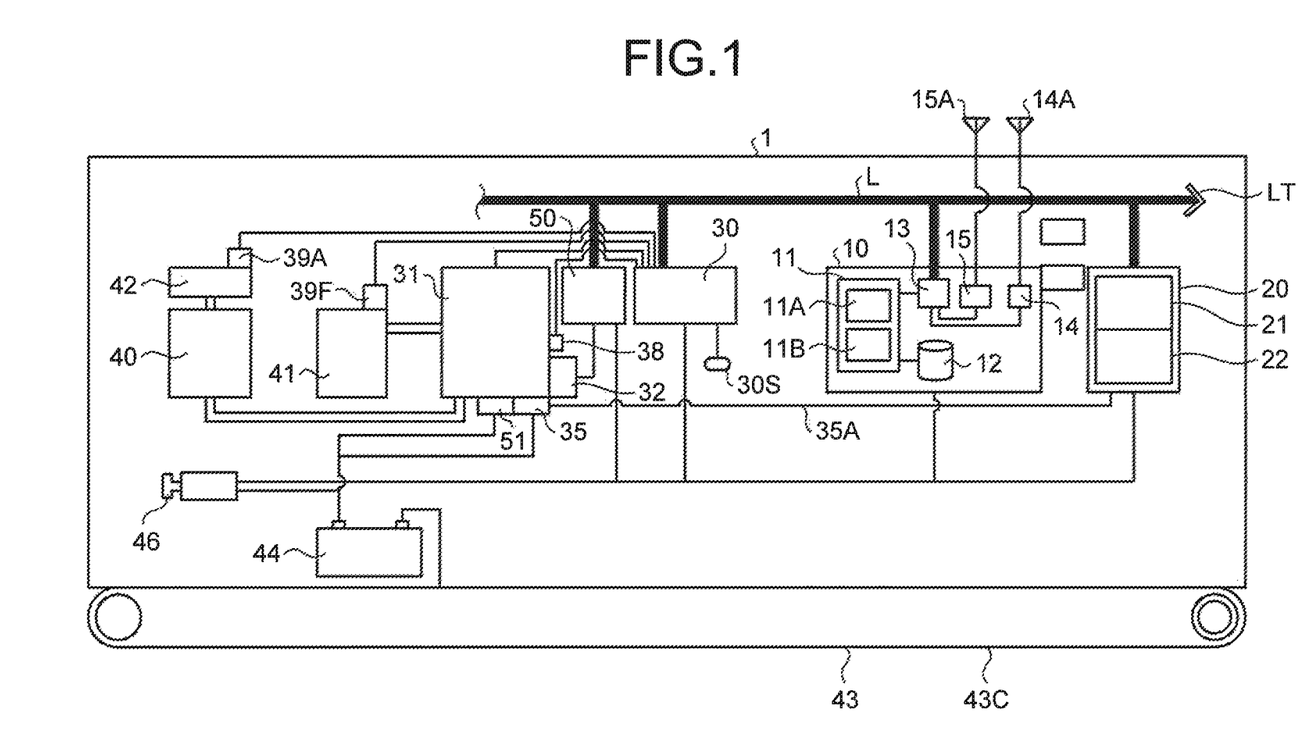
FIG. 1 is a block diagram illustrating an entire configuration of a work vehicle on which an error releasing device for the work vehicle according to an embodiment of the present invention is mounted.

FIG. 1 is a block diagram illustrating an entire configuration of a work vehicle on which an error releasing device for the work vehicle according to an embodiment of the present invention is mounted. A work vehicle 1 is, for example, an excavator. The work vehicle 1 includes a processor 10, a monitor 20, an engine controller 30 and a pump controller 50, each connected to an in-vehicle signal line L. Further, the work vehicle 1 includes an engine 31, a hydraulic pump 32, an alternator 35, a rotational speed detection sensor 38, a fuel tank 41, an exhaust gas treatment device 40, a urea water tank 42, a storage battery 44, a key switch 46 and a starter 51.

The engine controller 30 controls the exhaust gas treatment device 40 that purifies the engine 31 and exhaust gas emitted from the engine 31. The engine 31 is a diesel engine. The exhaust gas treatment device 40 purifies the exhaust gas by using urea SCR (Selective Catalytic Reduction), more specifically, using urea water as a reducing agent. Therefore, the urea water to be supplied to the exhaust gas treatment device 40 is stored in the urea water tank 42. Thus, the work vehicle 1 is mounted with the exhaust gas treatment system including the exhaust gas treatment device 40, the urea water tank 42 and so on.

Here, in the case where the engine controller 30 detects any exhaust gas treatment system related error, the engine controller executes derating control, namely, output limiting control for the engine 31. The exhaust gas treatment system related error is an error related to the exhaust gas treatment system caused by malfunction of a sensor device; for example, data transmission to the engine controller 30 from a liquid level detection sensor 39A detecting an amount of the urea water stored in the urea water tank 42 is stopped. The error detection is executed by the engine controller 30. The derating control is to limit output of the engine 31; for example, the derating control may limit the output of the engine 31 to a low-idle operating state, or limit outputs of both engine 31 and the hydraulic pump 32. In the case where the engine controller 30 executes the engine output limiting control for the engine 31 or the like, the control state is displayed on the monitor 20. Meanwhile, in the case where any instruction for error release is received from an error release processing unit 113 described later, the engine controller 30 releases the engine output limiting control.

Additionally, the engine controller 30 controls a fuel amount to be supplied to the engine 31 based on a rotational speed of a crankshaft of the engine 31 detected by the rotational speed detection sensor 38, an opening level of a fuel adjustment dial 30S and so on. In other words, the engine controller 30 controls operation of the engine 31. The engine controller 30 controls the urea water amount to be supplied to the exhaust gas treatment device 40 from the urea water tank 42 based on, for example, an amount of nitrogen oxide contained in the exhaust gas emitted from the engine 31. For example, the exhaust gas treatment device 40 includes a sensor that detects the amount of nitrogen oxide contained in the exhaust gas, and when the nitrogen oxide detected by this sensor exceeds a predetermined amount, the exhaust gas treatment device 40 supplies the urea water from the urea water tank 42 to an injector not illustrated, and the injector injects the urea water to the exhaust gas. The nitrogen oxide contained in the exhaust gas is reduced with the urea water into nitrogen and water.

Further, the engine controller 30 obtains a residual amount of the fuel inside the fuel tank 41 based on a detection value of a liquid level detection sensor 39F that detects a fuel amount stored in the fuel tank 41. The engine controller 30 transmits information indicating the obtained residual amount of the fuel to the monitor 20, and the residual amount of the fuel is displayed at a fuel gauge, for example. The engine controller 30 obtains a residual amount of the area water in the urea water tank 42 based on a detection value of the liquid level detection sensor 39A that detects the urea water amount stored in the urea water tank 42. The engine controller 30 transmits the obtained residual amount of the urea water to the monitor 20, and the monitor 20 displays the residual amount of the urea water at a urea water level gauge, for example.

Moreover, the engine controller 30 transmits "signal indicating that the engine 31 is in operation" to the monitor 20 via the in-vehicle signal line L, and the monitor 20 counts a duration of receiving the signal to obtain an operating time. Meanwhile, the engine controller 30 receives a signal from the rotational, speed detection sensor 38 that detects the rotational speed of the engine 31, and generates the "signal indicating that the engine 31 is in operation" by using this signal, to transmit to the monitor 20. Even though the "signal indicating that the engine 31 is in operation" is not transmitted from the engine controller 30 to the monitor 20 for some reason, and even when an alternator signal from the alternator 35 is not transmitted to the monitor 20, the monitor 20 can obtain the operating time by counting the duration of receiving the signal (predetermined voltage) from the alternator 35.

A travel device 43 makes the work vehicle 1 travel with power generated by the engine 31. The travel device 43 includes a hydraulic motor not illustrated and a crawler 43C. The hydraulic motor included in the travel device 43 but not illustrated rotates by hydraulic oil supplied from the hydraulic pump 32 driven by the engine 31. The work vehicle 1 travels by the hydraulic motor not illustrated rotating the crawler 43C. The hydraulic pump 32 has an angle of a swash plate controlled by the pump controller 50, thereby controlling a discharge rate of the hydraulic oil supplied to the hydraulic cylinder or the like of the work machine not illustrated.

The work vehicle 1 includes the storage battery 44. The storage battery 44 is a secondary battery such as a lead storage battery or a nickel-hydrogen storage battery. The storage battery 44 supplies power to the starter 51 to start the engine 31, and supplies power to various kinds of electronic devices included in the work vehicle 1, such as the processor 10. The storage battery 44 is charged by power supplied from the alternator 35. The alternator 35 generates power by interlocking with the drive of the engine 31. The power generated by the alternator 35 is charged to the storage battery 44.

As described above, the alternator signal indicating that power is generated from the alternator 35 is transmitted to the monitor 20 via a signal line 35A. The monitor 20 can determine, by receiving the alternator signal, whether the alternator 35 is normally operating. Meanwhile, as described above, the monitor 20 may constantly obtain the operating time of the work vehicle 1 by counting the duration of receiving the alternator signal instead of using the "signal indicating that the engine 31 is in operation".

The power supplied from, the storage battery 44 is supplied to the electronic devices such as the starter 51, the pump controller 50, the engine controller 30, the processor 10 and the monitor 20 via the key switch 46. The key switch 46 is electrically connected to the storage battery 44, and further, the key switch 46 is electrically connected to the pump controller 50, the engine controller 30, the processor 10 and the monitor 20. A cylinder key, a push-button, an immobilizer key utilizing wireless communication may be used for the key switch 46, for example. When the key switch 46 is turned ON, power is supplied from the storage battery 44 to the pump controller 50, the engine controller 30, the processor 10 and the monitor 20. When the key switch 46 is turned OFF, power supplied from the storage battery 44 to the pump controller 50, the engine controller 30, the processor 10 and the monitor 20 is blocked.

The processor 10 includes a processing unit 11, a storage unit 12 and an input/output unit 13. The processor 10 controls the work vehicle 1, generates abnormality information and collects operational information. The processor 10 transmits the generated abnormality information and operational information to outside of the work vehicle 1 via a communication device 14 and an antenna 14A, for example.

The operational information includes information obtained from the various kinds of sensors such as a pressure sensor not illustrated, the rotational speed detection sensor 38, a temperature sensor, or the liquid level detection sensors 39A, 39F. For instance, the information obtained from the pressure sensor includes hydraulic pressure of engine oil. Further, the information obtained from the rotational speed detection sensor 38 includes the rotational speed of the engine 31, and the information obtained from the temperature sensor includes cooling water temperature of the engine 31. The operational information also includes positional information of the work vehicle 1 detected by a position detector 15 and information related to abnormality that has occurred in the work vehicle 1. The information related to abnormality that has occurred in the work vehicle 1 includes, for example, a certain error code, an abnormality type or an occurrence time of the abnormality. The operational information may include information indicating that the work vehicle 1 is normally operating such as the operational information, not limited to the information related to abnormality that has occurred in the work vehicle 1. Note that the operational information may include the exhaust gas treatment system related error.

The processing unit 11 generates the operational information. Also, the processing unit 11 includes an authentication unit 11A and the error release processing unit 11B. When temporary input information, such as a one-time password for releasing the exhaust gas treatment system related error, is input from the monitor 20, the authentication unit 11A authenticates the temporary input information. In the case where the authentication unit 11A authenticates the temporary input information, the error release processing unit 11B releases the exhaust gas treatment system related error of a target of the release, and executes processing to release the output limiting control by the engine controller 30.

The input/output unit 13 is an interface electrically connecting the inside of the processor 10 to the in-vehicle signal line L. The in-vehicle signal line L is, for example, a CAN (Controller Area Network). A terminal LT is electrically connected to the in-vehicle signal line L. By connecting a terminal device or the like to the terminal LT, the terminal device and the processor 10 or the like can mutually exchange information via the terminal LT and the in-vehicle signal line L.

The communication device 14 includes the antenna 14A. The communication device 14 is used when the processor 10 communicates with the outside of the work vehicle 1. The position detector 15 includes an antenna 15A for GPS. The position detector 15 converts a radio wave received by the antenna 15A for GPS to an electrical signal to obtain positional information of the work vehicle 1.

Figure 2:
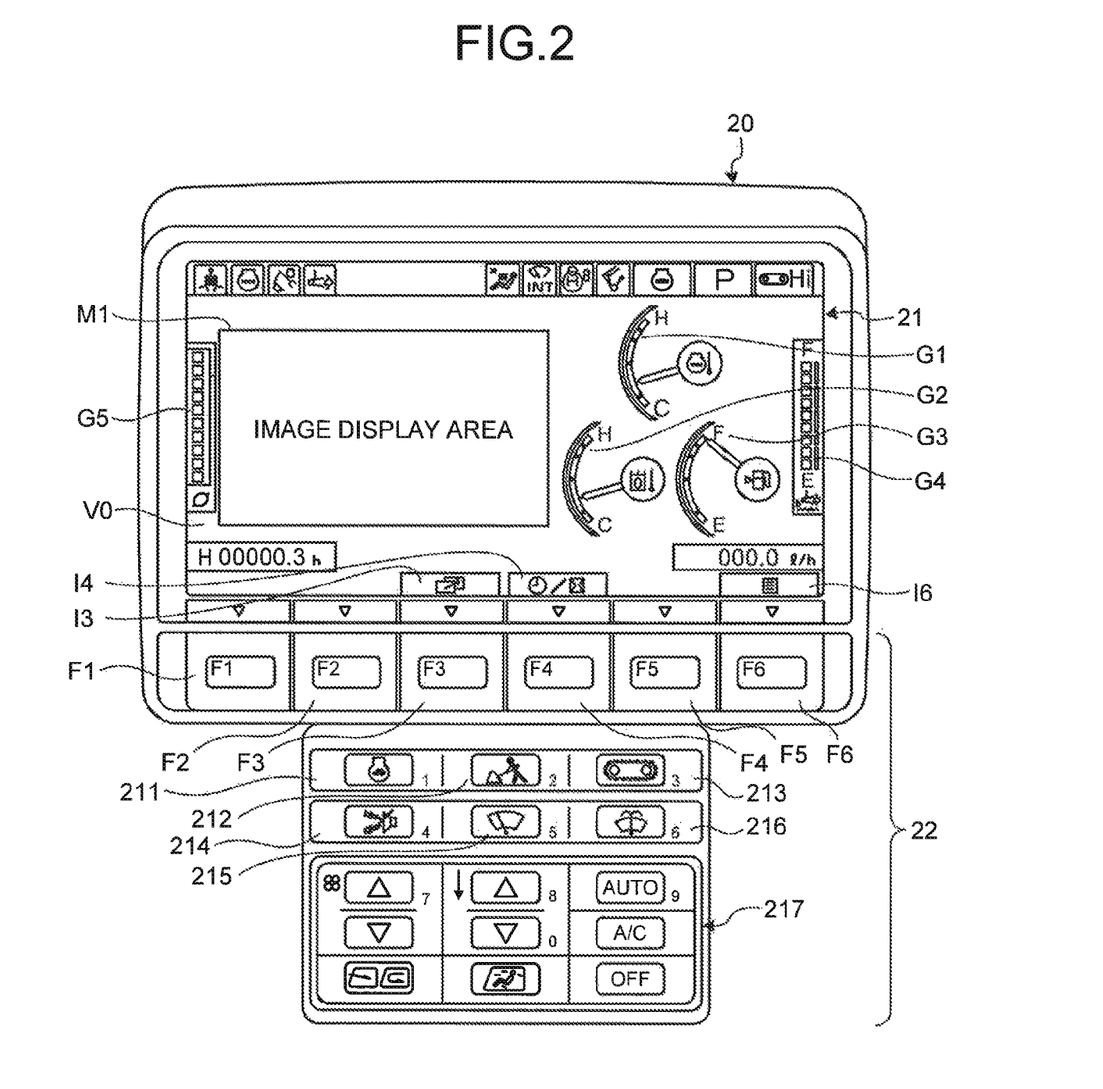
FIG. 2 is a diagram illustrating an appearance structure of a monitor.

As illustrated in FIGS. 1 and 2, the monitor 20 is a display device that includes a display unit 21 for displaying various kinds of information of the work vehicle 1, and an input unit 22 for inputting the various kinds of information. As illustrated in FIG. 2, the input unit 22 includes a plurality of switches. In the input unit 22, function switches respectively displayed as F1 to F6 at a lower portion of the display unit 21 are switches for inputting signals corresponding to icons displayed by the display unit 21 at upper portions of the respective switches. Below the function switches F1 to F6, provided are: an automatic deceleration switch 211 for executing automatic deceleration control to reduce an engine speed to a predetermined engine speed when a work machine lever is returned to a neutral position; a work mode selection switch 212 for selecting a work mode of the work vehicle 1 from among a plurality of work modes; a travel speed level selecting switch 213 for selecting a travel speed level of the work vehicle 1 from among a plurality of travel speed levels; a buzzer cancel switch 214 for cancelling buzzer sound generated when the work vehicle 1 becomes a predetermined warning state; a wiper switch 215 for actuating a wiper mounted on a windshield of an operation room; a washer switch 216 for actuating a washer to inject cleaning water to the windshield; and an air conditioner switch 217 for operating various kinds of functions of an air conditioner inside the operation room. Meanwhile, for the input unit 22, a touch panel such as of a resistance film type can be adopted. Further, among the respective switches of the input unit 22, the switches with numbers indicated on the right side thereof may function as a ten-key numerical keypad.

Further, the input unit 22 may be a separate body from the monitor 20, and the input unit 22 may be provided on a console inside the operation room not illustrated, for example.

The screen displayed by the display unit 21 illustrated in FIG. 2 is an initial standard screen V0 when the key switch 46 is in a key-on state. In the description of the present embodiment, a right-hand side is defined as right and a left-hand side is defined as right when an operator of the work vehicle 1 sits on an operator's seat and views the display unit 21 of the monitor 20. An image display area M1 is provided on a left area of the initial standard screen V0. In this image display area M1, an image captured by a camera is displayed. The camera is set on an upper portion of a counterweight not illustrated in order to capture a rear view of the work vehicle 1, for example. Additionally, on a right area of the initial standard screen V0, an engine water gauge G1 indicating a cooling water temperature of the engine, a hydraulic oil temperature gauge G2 indicating a hydraulic oil temperature inside a hydraulic circuit, and a fuel level gauge G3 indicating a residual amount level of the fuel are displayed being arranged in a triangle shape. A needle of each of the gauges G1 to G3 moves based on a detection signal of a corresponding sensor. Meanwhile, the hydraulic oil temperature gauge G2 is not necessarily displayed on the initial standard screen V0. Further, each of the level gauges G1, G2, and G3 may be displayed, being arranged in a vertical direction or in a lateral direction instead of being arranged in the triangle shape.

Additionally, on the right side of the initial standard screen V0, a urea water level gauge G4 indicating the residual amount of the urea water inside the urea water tank 42 is displayed in a bar shape. Meanwhile, on the left side of the initial standard screen V0, a fuel consumption gauge G5 indicating an average fuel consumption amount of a predetermined time and an instant fuel consumption amount is displayed in a bar shape.

On the other hand, guidance icons respectively corresponding to the function switches F1 to F6 are displayed depending on necessity at positions above the respective function switches F1 to F6 at the lower position of the initial standard screen V0. In FIG. 2, guidance icons I3, I4, and I6 which respectively correspond to the function switches F3, F4, and F6 are displayed. For example, the guidance icon I6 is an icon standing for switching to a user mode screen, not illustrated, for executing settings such as illuminance control or time adjustment for the screen displayed by the display unit 21.

The user mode screen is displayed by pressing the function switch F6 when the initial standard screen V0 is being displayed. The user mode screen is a user menu display screen in which a general user (operator who operates the vehicle) performs settings and the like. Further, when the initial standard screen V0 is being displayed, it is possible to switch to a service menu display screen in which a specific person performs settings by executing a procedure known by the specific person. The "specific person" referred here includes, for example, a manager of a work vehicle rental company and a service man from a work vehicle dealer, and also includes a person who has acquired the method of releasing the exhaust gas treatment system related error through a proper channel and a person provided with an authorization to release the exhaust gas treatment system related error. In the case of switching to the service menu display screen, the input unit 22 is used to input a password unknown to a general user and execute a specific operation (for instance, simultaneously pressing any plural switches of the input unit 22). Thus, the settings are preferably made such that the general user cannot switch to the service menu display screen.

The service menu display screen can display the menus necessary for the specific person to perform fault diagnosis or failure analysis at the time of maintenance. Specifically, the following menus are displayed, for example: "monitoring" indicating a detection result of an item selected from among the items detected by the various kinds of sensors, "fault history" displaying a history of faults, "maintenance history" displaying a history of past maintenance, "maintenance mode setting" for setting a mode at the time of maintenance, "initial value setting" for setting whether to use optional functions and setting an initial value for monitoring, "inspection" for selecting an operation menu associated with the inspection such as "error release" later described.

(Error Release Processing)

Next, an operating procedure of the error release processing will be described based on the screen transition diagram illustrated in FIG. 3. First, for example, a service man (hereinafter referred to as an "operator") executes input of the password unknown to the general user and the specific operation as described above as the specific person who intends to execute the error release when the initial standard screen V0 illustrated in FIG. 2 is being displayed on the display unit 21. After that, in the case of selecting the "maintenance" menu by operating the input unit 22 when the service menu screen, not illustrated, is being displayed, the display unit 21 displays an inspection screen V1 illustrated in FIG. 3. In the case where the operator selects an item by using icons for vertical movement by pressing the function switches F3 and F4, and confirms with a determination icon I1 by pressing the function switch F6 when the inspection screen V1 is being displayed, a display screen corresponding to the selected item, not illustrated, is displayed.

Figure 3:
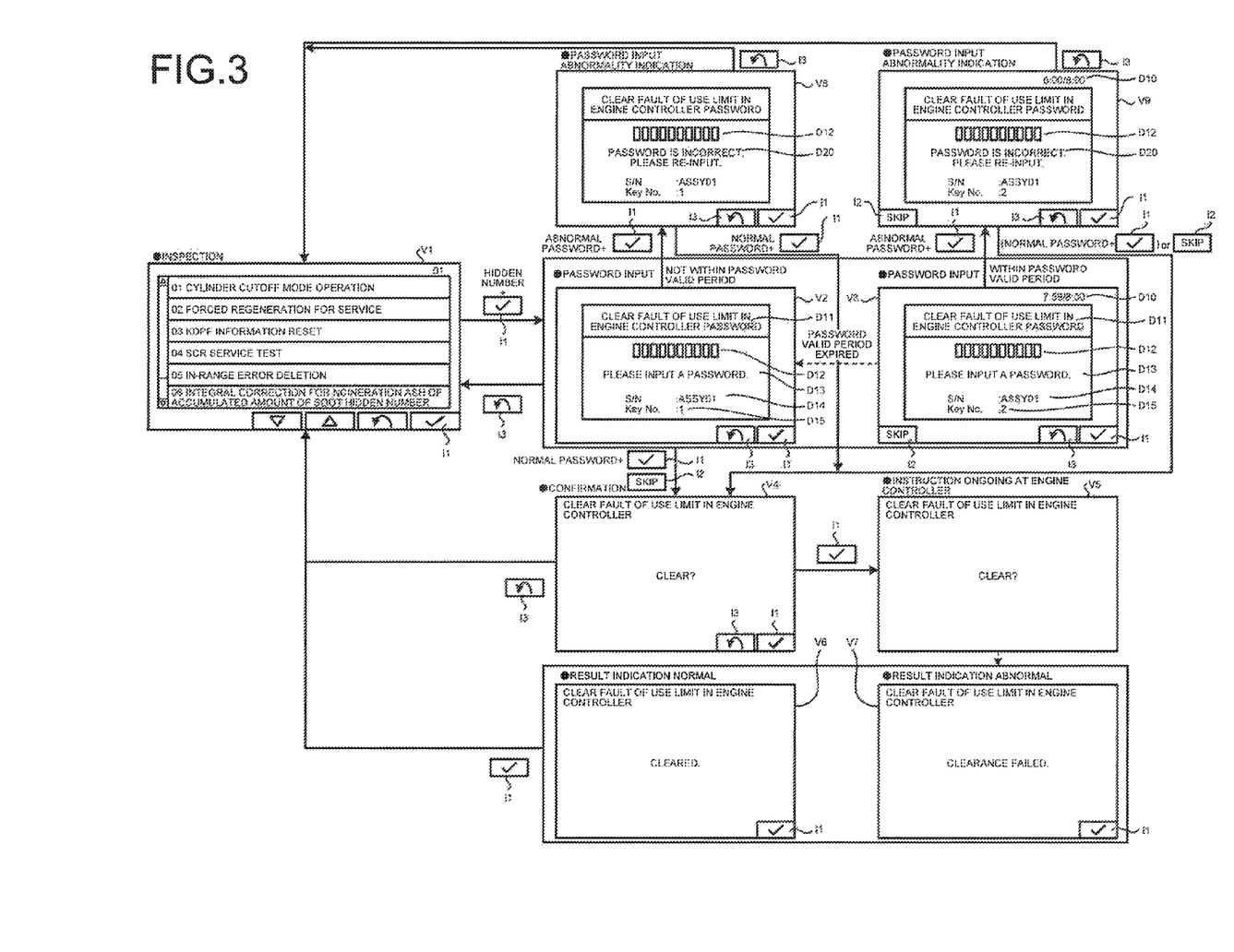
FIG. 3 is a diagram illustrating screen transitions on a display screen displaying along an operating procedure of error release processing.

On the other hand, as illustrated in FIG. 3, in the case where the operator inputs a hidden number as hidden information from the input unit 22 and selects the determination icon I1 when the inspection screen V1 is being displayed, a password input screen V2 is displayed on the display unit 21. The hidden information is information not displayed on the inspection screen V1. The hidden number is, for example, "90" and can be input by operating the switches that can function as the ten-key numerical keypad as described above. The password input screen V2 is one of the service menu display screen.

In the password input screen V2, a serial number D14 and a key number D15 are displayed as illustrated in FIG. 3. The serial number D14 and the key number D15 are inquiry information D1 necessary at the time of acquiring a one-time password D2 later described as the temporary input information from an external device 100 illustrated in FIG. 4. The serial number D14 has 6 digits, for example. Note that the serial number D14 may be, for example, a product serial number of the monitor 20, but may be a specific number preliminarily determined so as to use later. Further, a value of the key number D15 is incremented every time the one-time password D2 is authenticated in the authentication unit 11A (hereinafter, referred to as password authentication, as necessary), and then is displayed on the display unit 21. Note that the key number D15 is a key number peculiar to the exhaust gas treatment system related error, and independent from key numbers used for other errors. Besides, title information D11, password input area information D12, and password input request information D13 are displayed on the password input screen V2. Moreover, the determination icon I1 and a return icon I3 are displayed on the password input screen V2.

In the case of inputting a normal one-time password D2 and selecting the determination icon I1 on the password input screen V2, the password authentication is executed by the authentication unit 11A, and the screen switches to a confirmation screen V4. On the confirmation screen V4, a confirmation message to confirm whether to release the exhaust gas treatment system related error is displayed.

After that, in the case of selecting the determination icon I1 when the confirmation screen V4 is being displayed on the display unit 21, the error release processing unit 11B provides an error release instruction to the engine controller 30 to release the exhaust gas treatment system related error. While the release instruction is being provided, the screen switches from the confirmation screen V4 to a release instruction ongoing screen V5 on which the determination icon I1 and the return icon I3 are eliminated. After that, in the case where release of the exhaust gas treatment system related error is successfully completed by the engine controller 30, a normal end screen V6 is displayed, and in the case of abnormally completed, an abnormal end screen V7 is displayed. Then, the screen returns to the inspection screen V1 by selecting the determination icon I1. Meanwhile, in FIG. 3, release of the exhaust gas treatment system related error is displayed as "CLEAR FAULT OF USE LIMIT IN ENGINE CONTROLLER".

On the other hand, in the case of inputting an abnormal one-time password D2 and selecting the determination icon I1 on the password input screen V2, the password authentication by the authentication unit 11A fails. In this case, the display unit 21 changes the screen to a password re-input screen V8. On this password re-input screen V8, password re-input request information D20 that is a message to request re-input of the one-time password D2 is displayed instead of the password input request information D13. The serial number D14 and the key number D15 are also displayed on the password re-input screen V8 in the same display style as the password input screen V2.

In the case where the operator inputs the normal one-time password D2 and selects the determination icon I1 on the password re-input screen V8, the password authentication by the authentication unit 11A is successfully executed and the screen switches to the confirmation screen V4. On the other hand, in the case where the operator selects the return icon I3 on the password re-input screen V8, the screen switches to the inspection screen V1.

Here, for example, in the case where the operator selects the return icon I3 on the confirmation screen V4 or the like after the password authentication and the screen switches to the inspection screen V1, and then the operator inputs the hidden number and selects the determination icon I1 again on the inspection screen V1 to switch the screen to the password input screen V2, the screen does not switch to the password input screen V2 but to the password input screen V3.

On the password input screen V3 after the password authentication, remaining valid period information of the password D10 and a skip icon I2 are displayed in addition to the displayed contents on the password input screen V2. However, since the password has been once authenticated, an incremented value is displayed as the key number D15. Here, displaying the remaining valid period information of the password D10 and the skip icon I2 are displayed on the password input screen V3 indicates that the password has been once authenticated, and re-inputting the one-time password D2 can be skipped during the password valid period by pressing the function switch F1 corresponding to the skip icon I2. More specifically, within the password valid period, the screen changes to the confirmation screen V4 only by selecting the skip icon I2 because the password has been once authenticated.

Additionally, on the password input screen V3, password authentication processing can be executed by inputting a new one-time password D2 and selecting the determination icon I1 without selecting the skip icon I2. In this case, the incremented key number D15 is displayed on the password input screen V3, and the operator needs to input the new one-time password acquired from the external device 100, using, the serial number D14 and the incremented key number D15 as the inquiry information D1. The screen can be switched to the confirmation screen V4 even in the case of inputting the new normal one-time password D2 and selecting the determination icon I1 on the password input screen V3. Here, the normal one-time password D2 is, for example, a password generated by the external device 100 including a processing algorithm 101. On the other hand, the abnormal one-time password D2 is, for example, a password not generated by the external device 100 including the processing algorithm 101.

Meanwhile, according to the present embodiment, the password valid period is, for example, eight hours, and as illustrated in FIG. 3, a remaining period ("7:59" in the example of FIG. 3) and the password valid period ("8:00" in the example of FIG. 3) are displayed on the display unit 21 as the remaining valid period information of the password D10. When the password is authenticated, the remaining valid period information of the password D10 is displayed on the password input screen V3, as described above. After that, time passage of the password valid period is measured and displayed, counting down the remaining period. When the password valid period expires while the remaining valid period information of the password D10 is being displayed on the password input screen V3, the display unit 21 automatically returns to the password input screen V2 of a post-password valid period. When the screen switches to the password input screen V2, the remaining valid period information of the password D10 and the skip icon I2 are eliminated from the display screen. Meanwhile, the incremented key number D15 having been displayed on the password input screen V3 is displayed, keeping the same value.

Here, a reason for setting the password valid period is to enable the exhaust gas treatment system related error to be released without acquiring the new one time password D2 from the external device 100 again in the case where release of the exhaust gas treatment system related error is not executed immediately after the password authentication in spite of the fact that the one-time password D2 has been acquired from the external device 100 and the password has been authenticated as described in the present embodiment. Therefore, as described above, the remaining valid period information of the password D10 and the skip icon I2 are displayed on the password input screen V3 during the password valid period.

On the other hand, in the case of inputting a new abnormal one-time password D2 and selecting the determination icon I1 on the password input screen V3, password authentication by the authentication unit 11A fails. In this case, the display unit 21 switches to a password re-input screen V9 similar to the password re-input screen V8. On this password re-input screen V9, the remaining valid period information of the password D10 are kept being displayed, and the skip icon I2 is displayed as well. Therefore, in the case where the operator remembers the normal one-time password D2 when the password re-input screen V9 is displayed on the display unit 21, re-input of the one-time password D2 can be skipped by pressing the function switch F1 corresponding to the skip icon I2. Further, the password re-input request information D20 is displayed and also the serial number D14, the key number D15, etc. are displayed on the password re-input screen V9 in the same display style as the password re-input screen V8.

In the case of selecting the skip icon I2 on the password re-input screen V9, the screen switches to the confirmation screen V4. Otherwise, in the case of inputting the one-time password D2 which the operator has acquired, using the serial number D14 and key number D15 displayed on the password re-input screen V9 as the inquiry information D1, in other words, in the case of inputting the new normal one-time password D2 and then selecting the determination icon I1 on the password re-input screen V9, the password authentication by the authentication unit 11A is executed successfully and the screen switches to the confirmation screen V4. On the other hand, in the case where the operator selects the return icon I3 on the password re-input screen V9, the screen switches to the inspection screen V1.

Meanwhile, in the case of selecting the return icon I3 on the password input screens V2, V3, confirmation screen V4, or password re-input screen V8, V9, the screen can return to the inspection screen V1.

Figure 4:
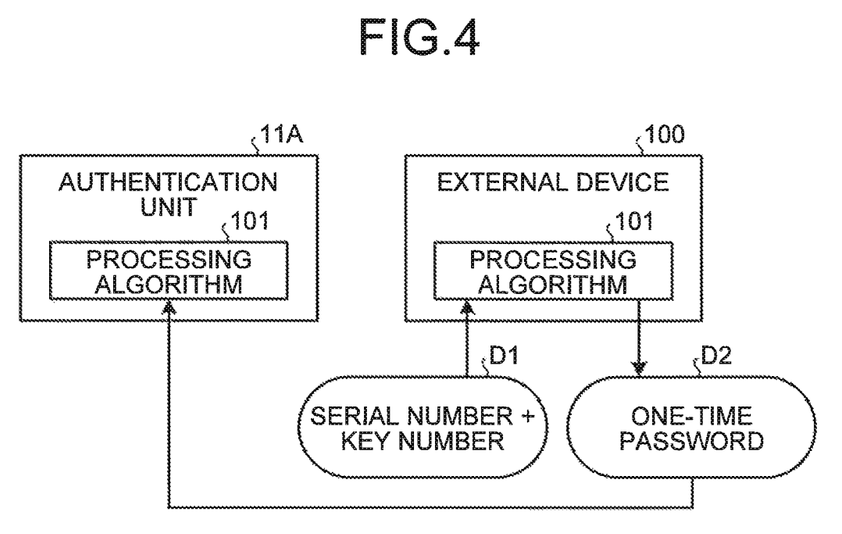
FIG. 4 is an explanatory diagram for describing one-time password generation by an external device.

Here, note that the password used in the present embodiment is not a fixed password, but the above-described one-time password D2. The one-time password D2 is a single-use password that can be used only once and has en digits, for example. By using this one-time password D2, the security level of the error release processing can be improved. As illustrated in FIG. 4, the one-time password D2 can be acquired by the service man making an inquiry to a manager or the like of the external device 100 on the phone or the like. The one-time password D2 can be acquired by informing, as the inquiry information D1, the serial number D14 and the key number D15 displayed on the password input screen V2, for example. The external device 100 includes the processing algorithm 101 that generates the one-time password D2. On the other hand, the authentication unit 11A included in the processor 10 of the work vehicle 1 includes the processing algorithm 101 common with the processing algorithm 101. The common processing algorithm 101 may be implemented by, for example, software or a specific function. Since the processing algorithm 101 on the authentication unit 11A side acquires the serial number D14 and the key number D15 from the monitor 20, the one-time password D2 same as the one-time password D2 acquired from the external device 100 is to be generated. As a result, the authentication unit 11A can execute the password authentication by simply comparing the one-time password D2 generated by the processing algorithm 101 on the authentication unit 11A side with the one-time password D2 acquired from the external device 100 and input to the authentication unit 11A via the input unit 22.

(Error Release Processing by Error Release Processing Unit)

Figure 5:
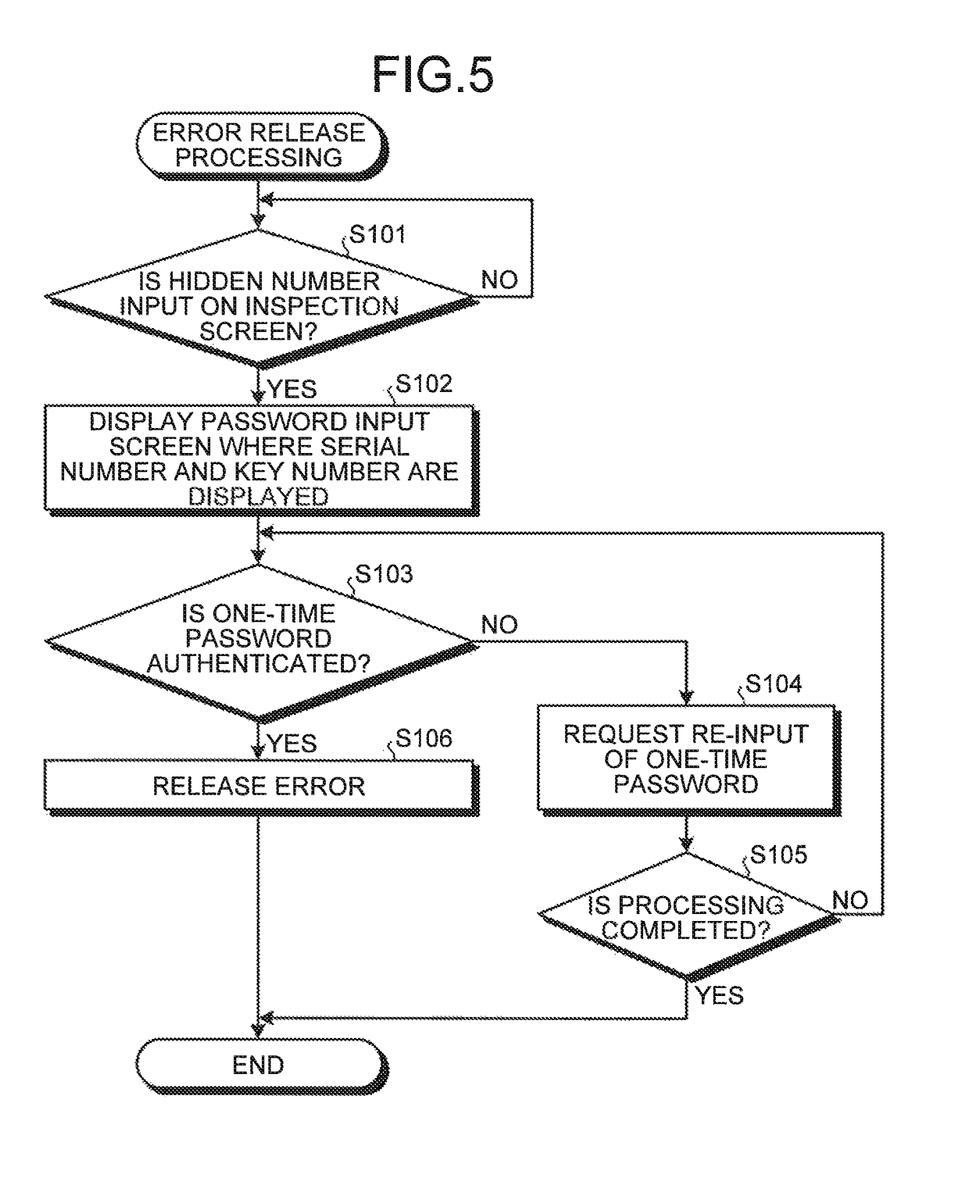
FIG. 5 is a flowchart illustrating an outline of an error release processing procedure executed by the error release processing unit.

Next, an outline of the error release processing procedure by the error release processing unit 115 will be described based on the flowchart illustrated in FIG. 5. First, the error release processing unit 11B determines whether a hidden number is input through the inspection screen V1 (step S101). In the case where the hidden number is not input (step S101: No), the determination processing in step S101 is repeated. In contrast, in the case where the hidden number is input (step S101: Yes), the serial number D14 and the key number D15 are displayed on the password input screen V2 (step S102). Here, the operator informs the external device 100 side of the serial number D14 and the key number D15 to acquire a one-time password D2, and then inputs the one-time password D2.

After that, the error release processing unit 11B determines whether the input one-time password D2 is authenticated by the authentication unit 11A (step S103). In the case where the one-time password D2 is authenticated (step S103: Yes), release of the exhaust gas treatment system related error is executed for the engine controller 30 (step S106), and then the processing ends. On the other hand, in the case where the one-time password D2 is not authenticated (step S103: No), the password re-input screen V8 is displayed to request re-input of the one-time password D2 (step S104). After that, whether an instruction to finish the processing is issued is determined (step S105). In the case where the instruction is issued (step S105: Yes), the processing is finished, and in the case where the instruction is not issued (step S105: No), the processing returns to step S103 to repeat the above-described processing.

Meanwhile, the above-mentioned temporary input information is the one-time password D2, but may be information indicating some specific operation with respect to the input unit 22 instead of the one-time password. For instance, the temporary input information may be the information indicating the specific operation of pressing automatic deceleration switch 211 and the work mode selection switch 212 of the input unit 22 simultaneously. The information indicating the specific information may have a function same as the one-time password D2. Alternatively, although the above-described temporary input information is the one-time password D2, a preliminarily determined password may be stored in the authentication unit 11A and the external device 100 in advance instead of the one-time password so as to release the exhaust gas treatment system related error by using this password. In this case, the specific person acquires the password by making an inquiry to the external device 100, and inputs the acquired password through the input unit 22 such that the authentication unit 11A executes authentication by comparing the password stored inside thereof with the input password.

Further, the authentication unit 11A or the error release processing unit 11B may be provided on the monitor 20, engine controller 30, etc. which are connected to the in-vehicle signal line L, besides the processor 10. According to the present embodiment, the work vehicle 1 mounted with the error releasing device for the exhaust gas treatment system related error has been described. However, the work vehicle 1 may also include an error releasing device different from the error releasing device described in the present embodiment for releasing other errors.

REFERENCE SIGNS LIST

1 Work vehicle
10 Processor
11 Processing unit.
11A Authentication unit
11B Error release processing unit
12 Storage unit
13 Input/output unit
14 Communication device
14A Antenna
15 Position detector
15A Antenna for GPS
20 Monitor
21 Display unit
22 Input unit
30 Engine controller
30S Fuel adjustment dial
31 Engine
32 Hydraulic pump
35 Alternator
35A Signal line
38 Rotational speed detection sensor
39A, 39F Liquid level detection sensor
40 Exhaust gas treatment device
41 Fuel tank
42 Urea water tank
43 Travel device
43C Crawler
44 Storage battery
46 Key switch
50 Pump controller
51 Starter
100 External device
101 Processing algorithm
D1 Inquiry information
D10 Password valid period information
D14 Serial number
D15 Key number
D2 One-time password
L In-vehicle signal line
V0 Initial standard screen
V1 Inspection screen
V2, V3 Password input screen
V4 Confirmation screen
V5 Release instruction ongoing screen
V6 Normal end screen
V7 Abnormal end screen
V8, V9 Password re-input screen

The invention claimed is:

1. An error releasing device for a work vehicle to release an error related to an exhaust gas treatment system when the error related to the exhaust gas treatment system has occurred, and an engine output limiting control has been executed, comprising:
an input unit configured to input at least a one-time password;
an authentication unit including a processing algorithm common with a processing algorithm of an external device that generates the one-time password, and configured to authenticate the input one-time password by using the processing algorithm; and
an error release processing unit configured to release the engine output limiting control by releasing the error related to the exhaust gas treatment system when the one-time password acquired from the external device by using inquiry information obtained through a predetermined operating procedure is input and further the one-time password is authenticated by the authentication unit.

2. The error releasing device for a work vehicle according to claim 1, wherein the temporary input information indicates a specific operation with respect to the input unit.

3. The error releasing device for a work vehicle according to claim 1, wherein the temporary input information includes a valid period.

4. The error releasing device for a work vehicle according to claim 3, comprising a display unit configured to display at least an input request display screen for the temporary input information,
wherein when the temporary input information input to the input unit is authenticated by the authentication unit, the valid period of the temporary input information is measured and a remaining time of the valid period is displayed on the input request display screen.

5. The error releasing device for a work vehicle according to claim 1, comprising a display unit configured to display at least an input request display screen for the temporary input information,
wherein the predetermined operating procedure includes an input operation of predetermined hidden information in order to display the input request display screen.

6. The error releasing device for a work vehicle according to claim 4, wherein the display unit displays the inquiry information necessary at a time of acquiring the temporary input information from the external device on the input request display screen.

7. The error releasing device for a work vehicle according to claim 6, wherein the inquiry information is a combination of a specific number of an error releasing device and a key number that is incremented every time the temporary input information is input.

8. An error releasing device for a work vehicle for releasing an error related to an exhaust gas treatment system when the error related to an exhaust gas treatment system has occurred, and an engine output limiting control has been executed, comprising:

an input unit configured to input at least a one-time password;

a display unit configured to display at least an input request display screen for the one-time password;

an authentication unit including a processing algorithm common with a processing algorithm of an external device that generates the one-time password, and configured to authenticate the input one-time password by using the processing algorithm; and an error release processing unit configured to release the engine output limiting control by releasing the error related to the exhaust gas treatment system when the one-time password acquired from the external device by using inquiry information displayed on the input request display screen through a predetermined operating procedure including an input operation for a predetermined hidden information is input and further the one-time password is authenticated by the authentication unit, wherein the inquiry information is a combination of a specific number of an error releasing device and a key number incremented every time the one-time password is input, the one-time password is a one-time password including a valid period or information indicating a specific operation with respect to the input unit, and when the one-time password input to the input unit is authenticated by the authentication unit, the valid period of the one-time password is measured and a remaining time of the valid period is displayed on the input request display screen.

9. An error releasing method for a work vehicle to release an error related to an exhaust gas treatment system when the error related to the exhaust gas treatment system has occurred, and an engine output limiting control has been executed, comprising:

acquiring inquiry information through a predetermined operating procedure;

executing authentication processing by inputting a one-time password acquired from an external device by using the inquiry information; and releasing the engine output limiting control by releasing the error related to the exhaust gas treatment system when the one-time password is authenticated.

\* \* \* \* \*